(12) United States Patent
Annamalai

(10) Patent No.: US 12,010,587 B2
(45) Date of Patent: Jun. 11, 2024

(54) BASE STATION SYNCHRONIZATION IN WIRELESS LOCATION SYSTEMS

(71) Applicant: CenTrak, Inc., Newtown, PA (US)

(72) Inventor: Karuppiah Annamalai, Yardley, PA (US)

(73) Assignee: CenTrak, Inc., Newtown, PA (US)

( * ) Notice: Subject to any disclaimer, the term of this patent is extended or adjusted under 35 U.S.C. 154(b) by 350 days.

(21) Appl. No.: 17/520,540

(22) Filed: Nov. 5, 2021

(65) Prior Publication Data

US 2022/0322039 A1 Oct. 6, 2022

Related U.S. Application Data

(60) Provisional application No. 63/170,937, filed on Apr. 5, 2021.

(51) Int. Cl.
*H04W 4/029* (2018.01)
*G01S 5/00* (2006.01)
*G01S 5/02* (2010.01)
*H04W 4/33* (2018.01)

(52) U.S. Cl.
CPC .......... *H04W 4/029* (2018.02); *G01S 5/0081* (2013.01); *G01S 5/0226* (2013.01); *G01S 5/02585* (2020.05); *H04W 4/33* (2018.02)

(58) Field of Classification Search
CPC ...................................... H04W 4/029
USPC ...................................... 455/456.1
See application file for complete search history.

(56) References Cited

U.S. PATENT DOCUMENTS

| 8,139,945 | B1 | | 3/2012 | Amir et al. |
| 9,510,146 | B1 | * | 11/2016 | Amir ................. H04B 10/1143 |
| 10,469,993 | B2 | * | 11/2019 | Arunachalam ....... H04W 4/021 |
| 2007/0021122 | A1 | * | 1/2007 | Lane ................. H04W 56/0025 |
| | | | | 455/67.16 |

* cited by examiner

*Primary Examiner* — Qutbuddin Ghulamali
(74) *Attorney, Agent, or Firm* — Kaplan Breyer Schwarz, LLP

(57) ABSTRACT

A system and methods are disclosed for synchronizing two or more groups of base stations in a wireless location system. In one embodiment, a first wireless base station belonging to a first group of wireless base stations transmits a first RF beacon for synchronizing the first group of wireless base stations and a second RF beacon that is used to synchronize a second group of wireless base stations. Wireless base stations in the first and second groups transmit respective non-RF (e.g., infrared, ultrasound, etc.) beacons that can be used to locate a portable tag.

19 Claims, 13 Drawing Sheets

110

106

BASE STATION SYNCHRONIZATION IN WIRELESS LOCATION SYSTEMS

STATEMENT OF RELATED APPLICATIONS

The present application claims priority to, and incorporates fully by reference, U.S. Provisional Patent Application No. 63/170,937 filed Apr. 5, 2021.

FIELD OF THE INVENTION

Aspects and implementations of the present disclosure relate to wireless location systems, and more specifically, to synchronization of base stations.

BACKGROUND

Indoor Real-Time Location (RTL) Systems (RTLS) are popular in the healthcare industry for a variety of applications ranging from asset tracking through patient and staff tracking, environmental or patient sensing (e.g., temperature), hygiene compliance, elopement (i.e., a patient leaving a facility without authorization), theft prevention, and so forth.

Conventional RTL systems typically use radio frequency (RF) transmission to determine location. In accordance with embodiments of the present disclosure, RF-based methods are augmented with infrared (IR) transmission as a localization method in order to improve accuracy to support room and sub-room level accuracies. In particular, each of the base stations has an IR transmitter, and a portable device to be located (sometimes referred to in the present disclosure as a "tag") has an IR receiver. In one embodiment, the base stations are located in rooms and corridors within an area (e.g., a building, etc.), and each of the IR base stations transmits an identification (ID) to one or more portable devices. The location of each portable device is determined by its vicinity to a base station.

The basic advantages of synchronization of IR based systems are described in U.S. Pat. No. 8,139,945 ("the '945 Patent"), which is hereby incorporated by reference in its entirety. Timing synchronization information is transmitted using a plurality of stationary IR base stations and one or more portable devices. Each IR base station is configured to receive the timing synchronization information and to transmit a corresponding IR location code in a time period based on the received timing synchronization information.

In the '945 Patent, each portable device is configured: 1) to receive the timing synchronization information; 2) to detect the IR location codes from the IR base stations; and 3) to transmit an output signal including a portable device ID representative of the portable device and the detected IR location code. Each portable device is synchronized to detect the IR location code in the time period based on the received timing synchronization information. The '945 Patent enables coexistence of multiple IR transmitters at the same physical space, the construction of virtual walls, as well as facilitating high tag update rate with extremely low power consumption for tags.

Embodiments of the '945 Patent operate under the assumption that each infrared node will have its own unique infrared ID. The assumption does not apply to embodiments of the present disclosure, in which distributed IR transmissions are employed. In such a distributed IR system, all IR base stations transmit the same infrared ID simultaneously. In some systems of the prior art, simultaneous transmission of identical infrared IDs has required the use of wired connections among the IR base stations.

Wired connections can pose problems during installation and are more difficult to expand, compared to wireless connections. However, over the air super-synchronization has not been used in some systems of the prior art because sufficient synchronization accuracies with low enough power consumption to support battery operated IR base stations had not been possible or available because the timing accuracy needs to be much better than the high modulation rates (typically 30-40 kHz) of the IR signals.

BRIEF DESCRIPTION OF THE DRAWINGS

The above and still further features and advantages of the present disclosure will become apparent upon consideration of the following detailed description of embodiments thereof, especially when taken in conjunction with the accompanying drawings wherein like reference numerals in the various figures are utilized to designate like components, and wherein.

Figure 1A:
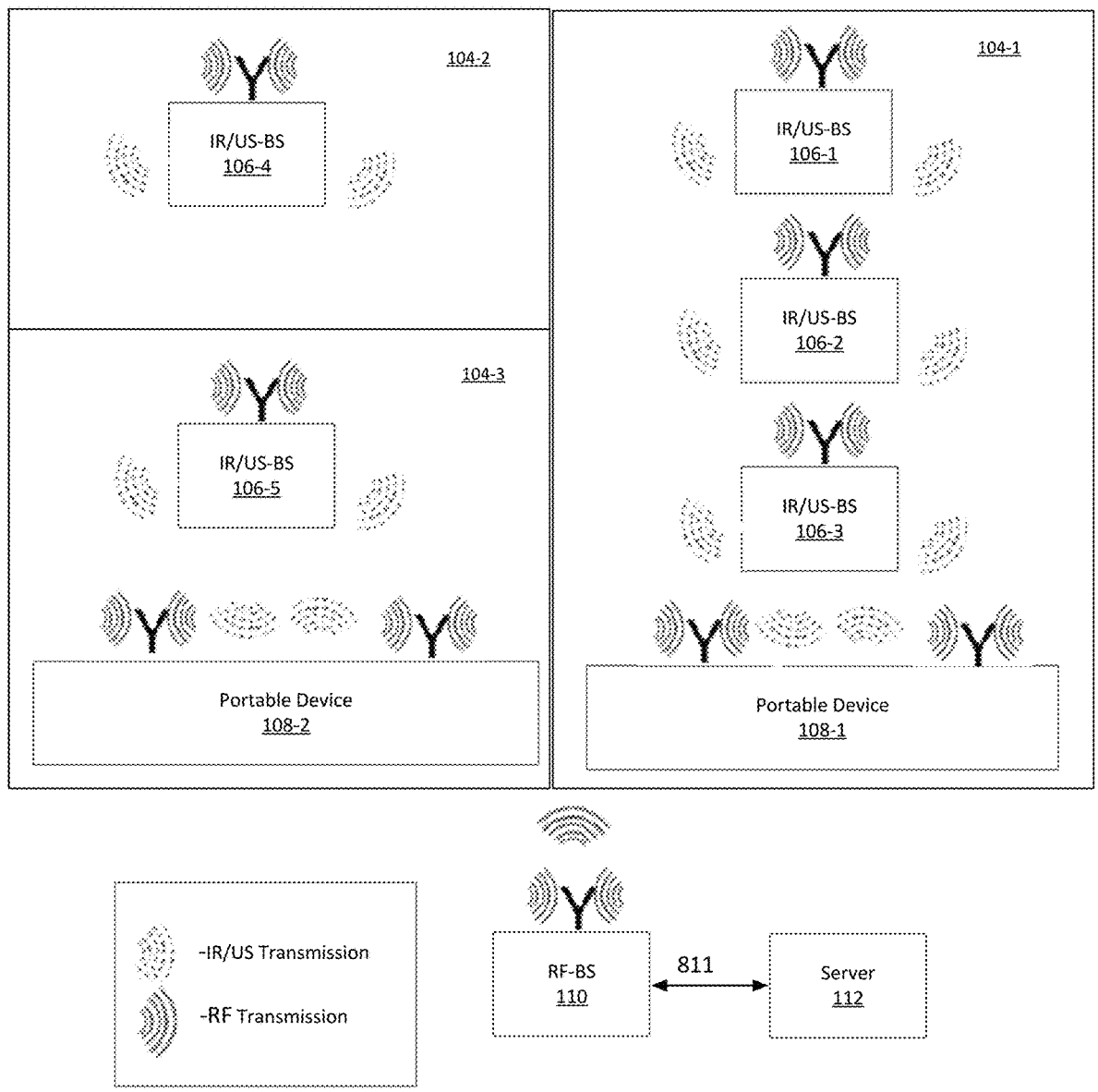
FIG. 1A depicts a block diagram of a system for locating and identifying portable devices in an enclosure, in accordance with one embodiment of the present disclosure.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, for example, a system using a server(s) and/or database(s), the disclosure is not limited to use with any particular type of communication system or configuration of system elements. Those skilled in the art will recognize that the disclosed techniques may be used in any communication application in which it is desirable to utilize location sensors and other sensors (e.g., temperature sensor(s), humidity sensor(s), etc.) that communicate with a central monitor.

The exemplary systems and methods of this disclosure may also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present disclosure, as other equally effective examples are possible and likely.

As used herein, the term "Wi-Fi" or "conventional Wi-Fi" refers generally to a bi-directional radio communication technology that operates based on one or more of the Institute of Electrical and Electronics Engineers (IEEE) 802.11 family of standards, which are incorporated herein by reference. The IEEE 802.11 standards specify the RF and protocol characteristics of a bi-directional radio communication system.

As used herein, the term "module" refers generally to a logical sequence or association of steps, processes or components. For example, a software module may comprise a set of associated routines or subroutines within a computer program. Alternatively, a module may comprise a substantially self-contained hardware device or circuit device. A module may also comprise a logical set of processes irrespective of any software or hardware implementation.

As used herein, the term "transmitter" may generally comprise any device, circuit, or apparatus capable of transmitting an electrical, electromagnetic, infrared, ultrasonic, or optical signal. As used herein, the term "receiver" may generally comprise any device, circuit, or apparatus capable of receiving an electrical, electromagnetic, infrared, ultrasonic, or optical signal. As used herein, the term "transceiver" may generally comprise any device, circuit, or apparatus capable of transmitting and receiving an electrical, electromagnetic, infrared, ultrasonic, or optical signal.

The term "computer-readable medium" as used herein refers to any tangible storage and/or transmission medium that participates in storing and/or providing instructions to a processor for execution. Such a medium may take many forms, including but not limited to, non-volatile media and volatile media. Non-volatile media includes, for example, NVRAM, flash media, or magnetic or optical disks. Volatile media includes dynamic memory, such as main memory. When the computer-readable media is configured as a database, it is to be understood that the database may be any type of database, such as relational, hierarchical, object-oriented, and/or the like.

In accordance with one embodiment of the present disclosure, a portable device to be located is an active RFID tag. An active RFID tag uses an internal power source (e.g., a battery, etc.) within the tag to continuously power the tag and its RF communication circuitry. In contrast, passive RFID relies on RF energy transferred from a reader to the tag to power the tag. Active RFID allows relatively low-level signals to be received by the tag, and the tag can generate relatively high-level signals back to the access point. Active tags may also initiate communication with an access point or other tags.

RTL systems are known that include base stations that transmit IR signals (i.e., IR base stations) with their respective base station ID (BS-ID) to portable devices that are equipped with IR receivers. Upon reception of a BS-ID, the portable device transmits both the device ID and the received BS-ID to a reception device, for example, by radio frequency (RF) or IR transmission. The RTL system may include a server that associates the BS-ID with the device ID (received from the portable device by the reception device). In this manner, the position of the portable device may be displayed as the position of the IR base station. In exemplary implementations, both base stations and tags are battery operated.

In accordance with embodiments of the present disclosure, all IR base stations transmit the same infrared ID at the same time. We refer to these embodiments as distributed IR systems. In some examples, the number of such base stations may be in some cases, six or more. All IR base stations with the same infrared ID are deemed to be a single location for position-locating purposes. For example, in order to create a virtual corridor between sets of bays, typically three IR base stations are used per bay, and the total number of IR base stations may exceed six. Using the same infrared ID at the same time avoids a problem of a tag mixing up the received signals, and the receiver not being able to decipher the signals. Although the infrared ID may be sent at different times, doing so may have several undesirable consequences. First, the tag response may be slower since a tag may have to wait N times the basic period to receive a signal. Second, embodiments may need to increase the basic rate and the tag will need to check for an IR signal N times more often, causing a corresponding increase in tag power consumption.

Referring now to FIG. 1A, a block diagram is shown of a system 100 for determining a location and an identity of portable devices 108 in an enclosure 102. System 100 may include a plurality of IR base stations (IR-BS) 106, one or more portable devices 108 and at least one RF base station (RF-BS) 110. In some embodiments, RF base station 110 may be a Wi-Fi access point (i.e., an RF access point).

RF base station 110 may transmit timing synchronization information (TSI) signal, for example, in a beacon, to IR base stations 106 and portable devices 108 that are each equipped with RF transceivers, by RF transmission. The TSI may be used by IR base stations 106 to transmit a corresponding BS-ID, i.e. an IR location code, in a period of time after receiving the TSI. The period of time for IR base stations 106 to transmit the respective BS-ID signals may be fixed or transmitted as a part of the information carried by the beacon.

Enclosure 102 may include a plurality of separate zones 104, which typically coincide with individual zones or rooms within enclosure 102. For example, zone 104-1 represents a corridor. Each zone may be provided with at least one IR base station 106. For example, corridor 104-1 includes IR base stations 106-1, 106-2, 106-3.

IR base station 106 may transmit very short bursts of IR location signals from an IR transmitter (i.e. corresponding BS-IDs) at periodic intervals based on the TSI received from RF-BS 110. Each IR base station 106 may transmit a BS-ID signal that may be identified at a central control as originating from a particular zone 104. The BS-ID may, for example, be transmitted with an IR modulating frequency that is typically around 40 kHz that may be in the form of bursts of the order of about 0.5 milliseconds long. It is understood that any suitable frequency and duration of the IR burst may be used. Although IR base station 106 is described as including an IR transmitter, it is contemplated that IR base station 106 may also include an IR receiver.

Portable devices 108 may be provided for persons or apparatuses. The portable devices 108 may include an IR receiver and an RF transmitter or transceiver (FIG. 4) which are coupled to each other. In this manner, the RF transceiver may receive the TSI and may transmit received BS-ID and its device ID at an RF carrier frequency to RF base station 110.

The modulated carrier signal received by RF base station 110 may be decoded to reproduce the BS-ID and the device ID.

Although IR base stations 106 are described, it is contemplated that the base stations 106 may also be configured to transmit a corresponding BS-ID by an ultrasonic signal, such that base stations 106 may represent ultrasonic base stations. Accordingly, portable devices 108 may be configured to include an ultrasonic receiver to receive the BS-ID from an ultrasonic base station. If an ultrasonic interface is used, then a differential time of arrival method may be used for location detection by the tag.

Figure 1B:
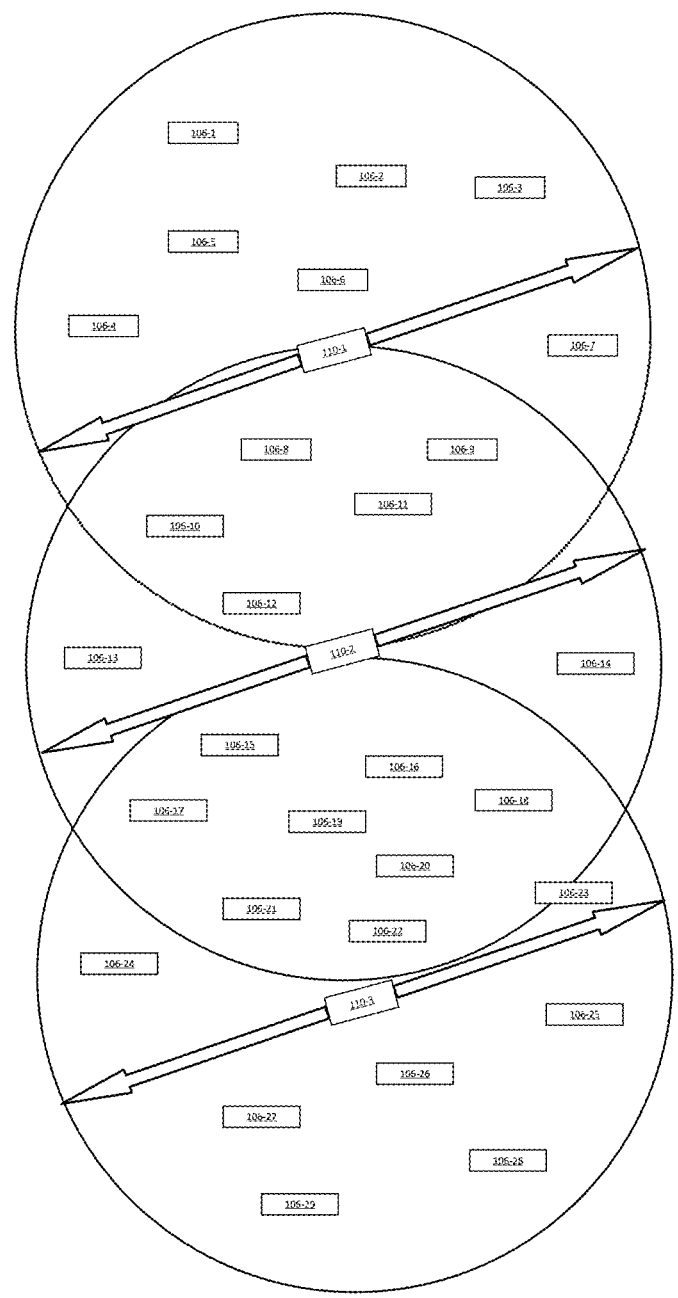
FIG. 1B depicts a configuration, in accordance with one embodiment of the present disclosure.

FIG. 1B depicts a configuration 150 in accordance with one embodiment of the present disclosure. Configuration 150 may represent a deployment in which a plurality of RF base stations 110 provide coverage to a covered area (e.g., room, corridor, etc.). Configuration 150 may include a plurality of RF base stations 110-1, 110-2 and 110-3, along with a respective coverage region, as denoted by differently-shaded regions. As illustrated, some of the RF coverage regions may spatially overlap. Overlap of RF base station 110 coverage areas helps prevent dead zones within the covered area.

Configuration 150 may further include a plurality of IR base stations, e.g., IR base stations 106-1 through 106-29. Configuration 150 is not limited to the positions or quantities of stations shown. Super-synchronization of each IR base station 106 is controlled by signals that IR base station 106 is able to receive from an RF base station 110. Each IR base station 106-*n* is able to receive timing synchronization signals from at least one RF base station 110-*n*. Some IR base stations, e.g., IR base stations 106-1 through 106-7 as illustrated, may be able to receive timing synchronization signals from only one RF base station (e.g., RF base station 110-1). Some IR base stations, e.g., IR base stations 106-8 through 106-12, and 106-15 through 106-22 as illustrated, may be able to receive timing synchronization signals from more than one RF base station 110 (e.g., RF base stations 110-1 and 110-2). In order to avoid RF collisions, RF base stations whose coverage areas may overlap are configured to operate on different frequencies or to transmit at slightly different times.

In order to avoid excessive levels of interference to IR base stations 106-*n* in overlap regions (e.g., IR base stations 106-8 through 106-12, and 106-15 through 106-22), adjacent RF base stations 110-*n* may transmit their timing synchronization signals at different times and/or frequencies. For example, RF base station 110-1 may be configured to transmit its timing synchronization signal at a first frequency or within a first timing slot. RF base station 110-2 may be configured to transmit its timing synchronization signal at a second frequency or within a second timing slot. Thus, although an IR base station 106 (e.g., IR base stations 106-8) may receive a first timing synchronization signal from a first source (e.g., from RF base station 110-1) and a second timing synchronization signal from a second source (e.g., from RF base station 110-2), the IR base station may use the received time slot and/or frequency information in order to distinguish between the different timing synchronization signals.

Figure 2:
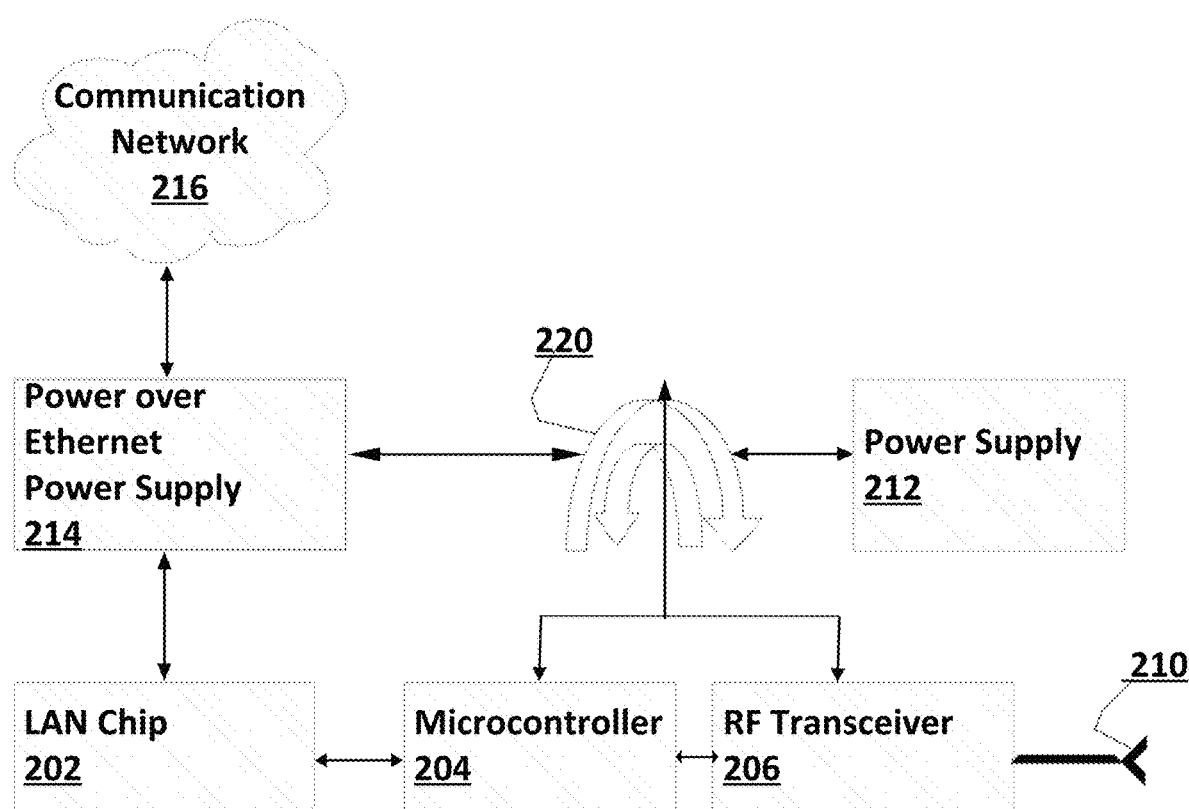
FIG. 2 depicts a block diagram of a radio frequency (RF) base station, in accordance with one embodiment of the present disclosure.

FIG. 2 depicts a block diagram of RF base station 110. RF base station 110 may include local area network (LAN) chip 202, microcontroller 204, RF transceiver 206, and antenna 210 In one embodiment of the present disclosure, the RF base stations 110 receive their timing synchronization via Ethernet. In another embodiment, the timing synchronization is transferred from one RF base station 110 to another.

LAN chip 202 may interface via Ethernet interface 214 to a communication network 216 such as a LAN, WAN, or Internet. Switch 220 may be used to select a power source for RF base station, e.g., between power supply 212 or power derived from Ethernet interface 214. Power supply 212 may represent a battery or an interface to conventional AC power.

RF transceiver 206 may be configured to receive RF transmissions, for example, from portable device 108 (FIG. 1A) or from another RF base station 110, from antenna 210. RF transceiver 206 may also be configured to transmit the TSI, such as by transmitting an RF beacon that includes the TSI, via antenna 210.

Microcontroller 204 may be configured to control LAN chip 202, and RF transceiver 206, for example, to transmit the TSI, communicate with other RF base stations and receive RF transmissions from portable devices 108 (FIG. 1A).

Figure 3:
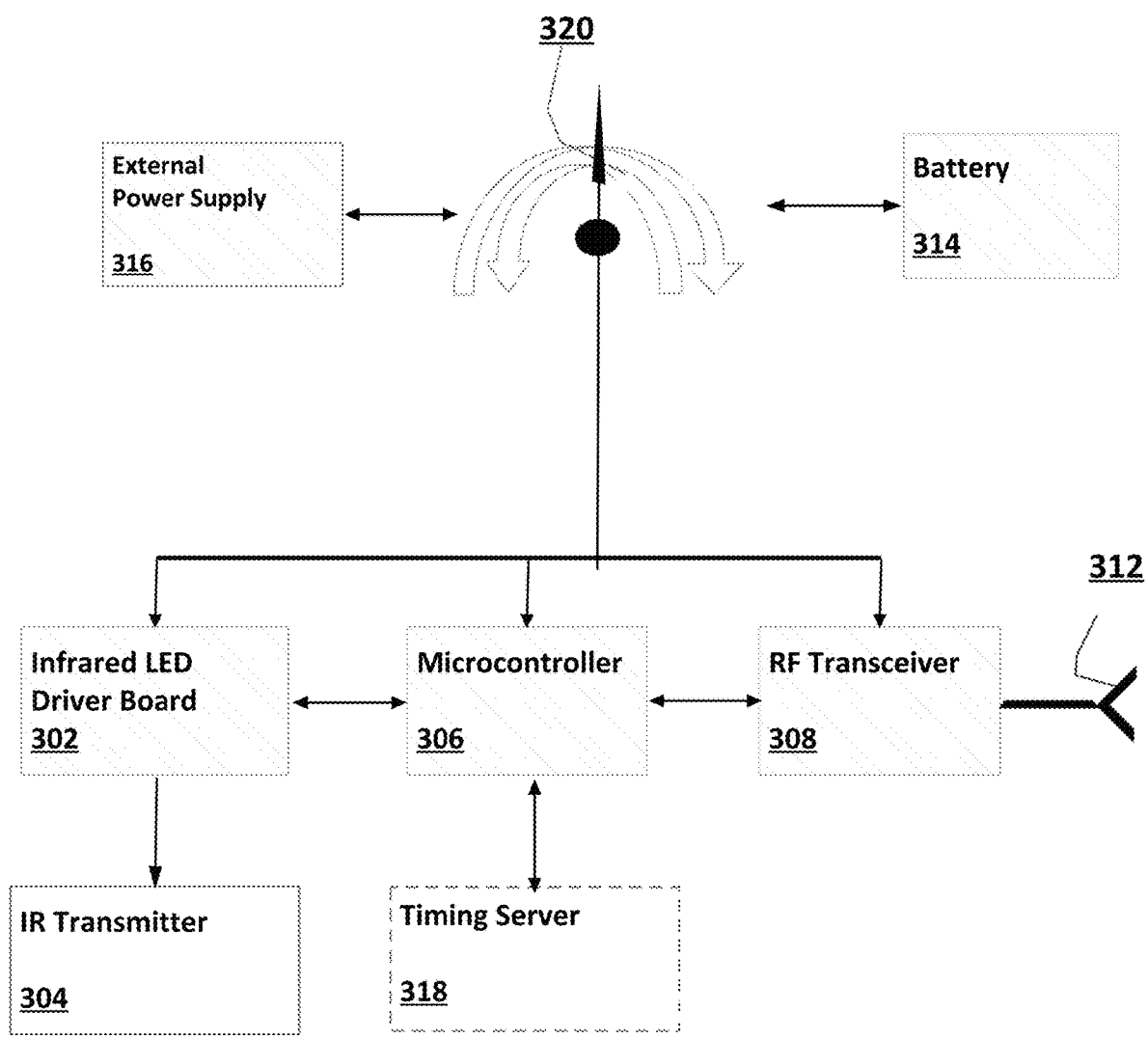
FIG. 3 depicts a block diagram of an infrared (IR) base station, in accordance with one embodiment of the present disclosure.

FIG. 3 depicts a block diagram of IR base station 106 in accordance with one embodiment of the present disclosure. IR base station 106 includes RF receiver or transceiver 308 (henceforth collectively referred to as RF transceiver 308), antenna 312, microcontroller 306, IR LED driver board 302 and IR transmitter 304. IR base station 106 may be powered by battery 314 or by an external power supply 316. Synchronized IR base stations 106 may provide for a simple and low cost installation and allow for a coexistence of IR base stations 106 without dead regions (typically caused by an overlap in coverage). RF transceiver 308 may be configured to receive RF transmissions, for example, beacons including the TSI from RF base station 110 (FIG. 1) via antenna 312. Switch 320 may be used to select a power source for IR base station 106, e.g., between external power supply 316 or battery 314.

IR base station 106 may further include an interface to a centralized timer 318. Centralized timer 318 may be, for example, a timing server accessible via a Network Time Protocol (e.g., NPTv4), as described in RFC-5905, incorporated herein by reference.

Although not shown in FIG. 3, a BS-ID associated with IR base station 106 may be stored by IR base station 106, for example, in a memory of microcontroller 306. Driver board 302 may be configured to transmit the associated BS-ID to IR transmitter 304. it is understood that IR transmitter may include any device suitable for transmitting an IR burst that includes the associated BS-ID.

Microcontroller 306 may be configured to control driver board 302, and RF transceiver 308. Based on the TSI received by RF transceiver 308 at time $T_1$ (see FIG. 5), microcontroller 306 may control driver board 302 to transmit the BS-ID at time $T_2$ (see FIG. 5), after the TSI is received. For example, referring to FIG. 5, at time $T_0$ the high speed clock 501 is activated. At time $T_1$ the IR base station 106 receives 503 the TSI 403. At time $T_2$, which is made as close as possible to $T_1$, IR transmitter 304 (see FIG. 3) may be controlled to transmit IR signal 505 including the BS-ID. High speed clock 501 stays on during transmission of IR signal 505. When IR signal 505 transmission ends, the high speed clock 501 stops and the only active clock is a low-speed clock 502 (see FIG. 5).

This process repeats with a period TK, i.e., at $TK+T_1$ another beacon 503 may again be received by IR base station 106 (FIG. 3). Although IR transmission 505 is illustrated as occurring once every period TK, it is contemplated that an IR base station transmission 505 may be activated multiple times in time period TK.

IR base station 106 may use an optional time adjust module 318 in order to receive relatively high-accuracy time estimates in order to correct a relatively lower-accuracy clock that is internal to IR base station 106. Time adjust module may be local to IR base station 106 or may be remote but communicatively coupled to IR base station 106.

Referring back to FIGS. 1A, 1B and 3, by synchronizing all of the nodes (e.g., the RF base station 110 and all IR base stations 106), portable device 108 and/or IR base stations 106 may be powered by battery 314. Because base stations 106 are battery powered, if the nodes of system 100 were not synchronized, the IR transmitter 304 would need to transmit IR signals more often so the tag could quickly be able to "find" the transmissions. IR transmission may be power consuming and high rate transmissions may quickly deplete the battery of base stations 106.

In accordance with one embodiment, IR base station 106 includes a coarse, low-speed timer, and a fine, high-speed timer, which inherently provides higher accuracy than the low-speed timer. In one embodiment, the timers are part of microcontroller 306, and may be used by microcontroller 306 to begin IR transmission to portable devices 108-n at highly accurate times.

Figure 4:
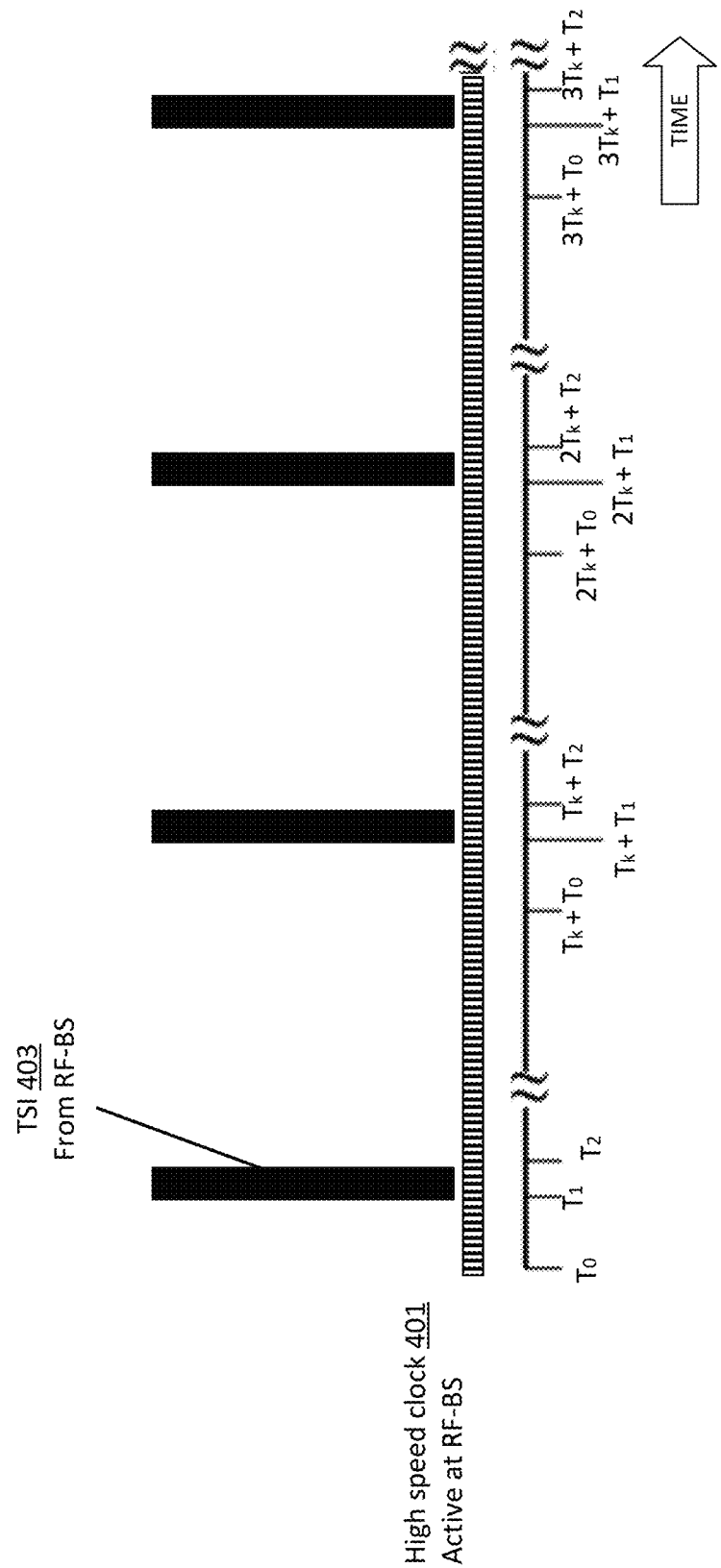
FIG. 4 depicts an example of timing of TSI from an RF base station, in accordance with one embodiment of the present disclosure.

FIG. 4 depicts an example of periodic timing of the transmission of TSI 403 from RF base station 110, in accordance with one embodiment of the present disclosure. Depending upon the context of usage, reference item 403 may refer to either the TSI signal, or to the act of sending the TSI signal. RF base station 110 may maintain a high-speed clock 401, which may be continuously powered if RF base station 110 is operated from a wired power source. RF base station 110 transmits a timing synchronization information (TSI) 403 having a period of TK seconds, and sent at times $T_1$, $TK+T_1$, $2TK+T_1$, $nTK+T_1$, with "n" being a positive integer. Typically, the period TK is in the range of $1<=TK<=60$ seconds. TSI 403 may be received by both the IR base stations 106 and portable devices 108, and may be used to control timing of an IR signal transmitted by IR base station 106. In some embodiments, IR base stations 106 may synchronize their clocks to TSI 403 as received from RF base station 110.

Figure 5:
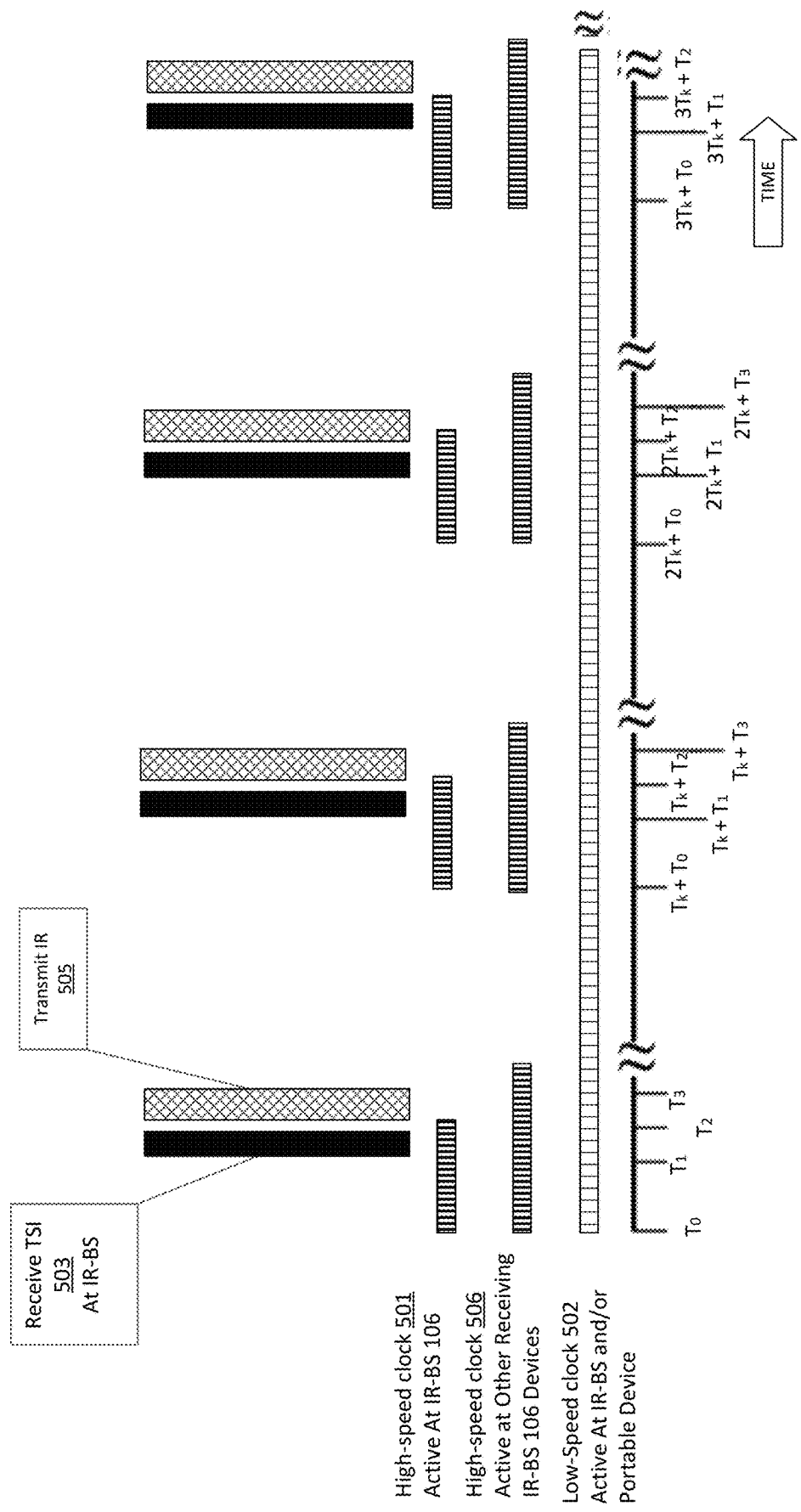
FIG. 5 depicts an example of timing of operations at an IR base station, in accordance with another embodiment of the present disclosure.

FIG. 5 depicts an example of timing of operations at an IR base station 106, in accordance with one embodiment of the present disclosure. All of the IR base stations 106 transmit a same IR-ID at a set delay from the time that each IR base station 106 received TSI 403. As illustrated, IR base station 106 receives TSI 403 signals periodically with a period of TK, which is the same period as illustrated in FIG. 4 for RF-BS 110. In particular, FIG. 5 depicts reception 503 and usage of TSI 403. Depending upon the context of usage, reference item 503 may refer to either the TSI signal received by IR base station 106, or to the act of receiving the TSI signal by IR base station 106. IR base station 106 may run a low-speed clock 502 substantially continuously. For example, low-speed clock 502 may run at about 32 kHz.

In some embodiments, IR base station 106 may further include a high-speed, high-accuracy clock 501. In one embodiment, clock 501 is an 8 MHz clock with 0.125 µS resolution and about 10 ppm accuracy. Timing accuracy between different IR base stations 106 ideally should not differ by more than about 2 µS. At predetermined times based upon low-speed clock 502, IR base station 106 may activate clock 501, clock 501 being activated at times to substantially ensure that clock 501 is active when TSI 403 is expected to be received 503 at IR base station 106. This operation reduces power consumption by not powering clock 501 when it will not be needed.

Usage of periodically-activated high-speed, high-accuracy clock 501 in order to provide greater timing accuracy when needed, than can be provided by low-speed clock 502, is referred to as super synchronization.

TSI 403 may include information that indicates a desired time delay between the receipt 503 of TSI 403 at IR base station 106, and the transmission 505 of an IR beacon transmitted by IR base station 106. Depending upon the context of usage, reference item 505 may refer to either the IR beacon transmitted by IR base station 106, or to the act of sending the IR beacon by IR base station 106. IR base station 106 may use the time delay indicated by TSI 403, together with high-speed clock 501, in order to more accurately control the time at which IR base station 106 transmits its IR beacon 505, e.g., by setting $T_2=T_1+TimeDelay$. Embodiments in accordance with the present disclosure use time-division multiplexing (TDM) and frequency-division multiplexing (FDM) in order to control TimeDelay in order to coexist with other RF stations 110 that control different IR base stations 106.

As shown in FIG. 5, high-speed clock 501 may be activated at times $T_0$, $TK+T_0$, $2TK+T_0$, ... $nTK+T_0$, with $T_0<T_1$ and "n" being a positive integer. IR base station 106 may use high-speed clock 501 to denote the accurate time 503 of the RF base station clock for reception of TSI 403 (i.e., denote the occurrence of times $T_1$, $TK+T_1$, $2TK+T_1$, ... $nTK+T_1$). At receipt 503 of TSI 403, the desired time delay is decoded from TSI or a priori information given to the base station 403, and the decoded time delay is applied to high-speed clock 501 in order to accurately determine the times at which to transmit the IR beacon 505, i.e., at times $T_2$, $TK+T_2$, $2TK+T_2$, ... $nTK+T_2$. High-speed clock 501 may be deactivated shortly after the end of transmission of IR beacon 505, i.e., shortly after times $T_3$, $TK+T_3$, $2TK+T_3$, ... $nTK+T_3$. By deactivating high-speed clock 501 when it is no longer needed, power consumption by IR base station 106 may be reduced. Typically, high-speed clock 501 needs to be activated for only about 10 ms to about 200 ms within each period of TK seconds.

In some embodiments, high-speed clock 501 may be activated or corrected based upon time information derived from a request for time from optional time adjust module 318, and an associated response from time adjust module 318. For example, IR base station 106 may transmit a request for time to time adjust module 318. A response would be received and used to correct low-speed clock 502. In this way, IR base station 106 is able to more accurately estimate the time at which high-speed clock 501 should be turned on, e.g., $T_0$, $nTK+T_0$.

Figure 6:
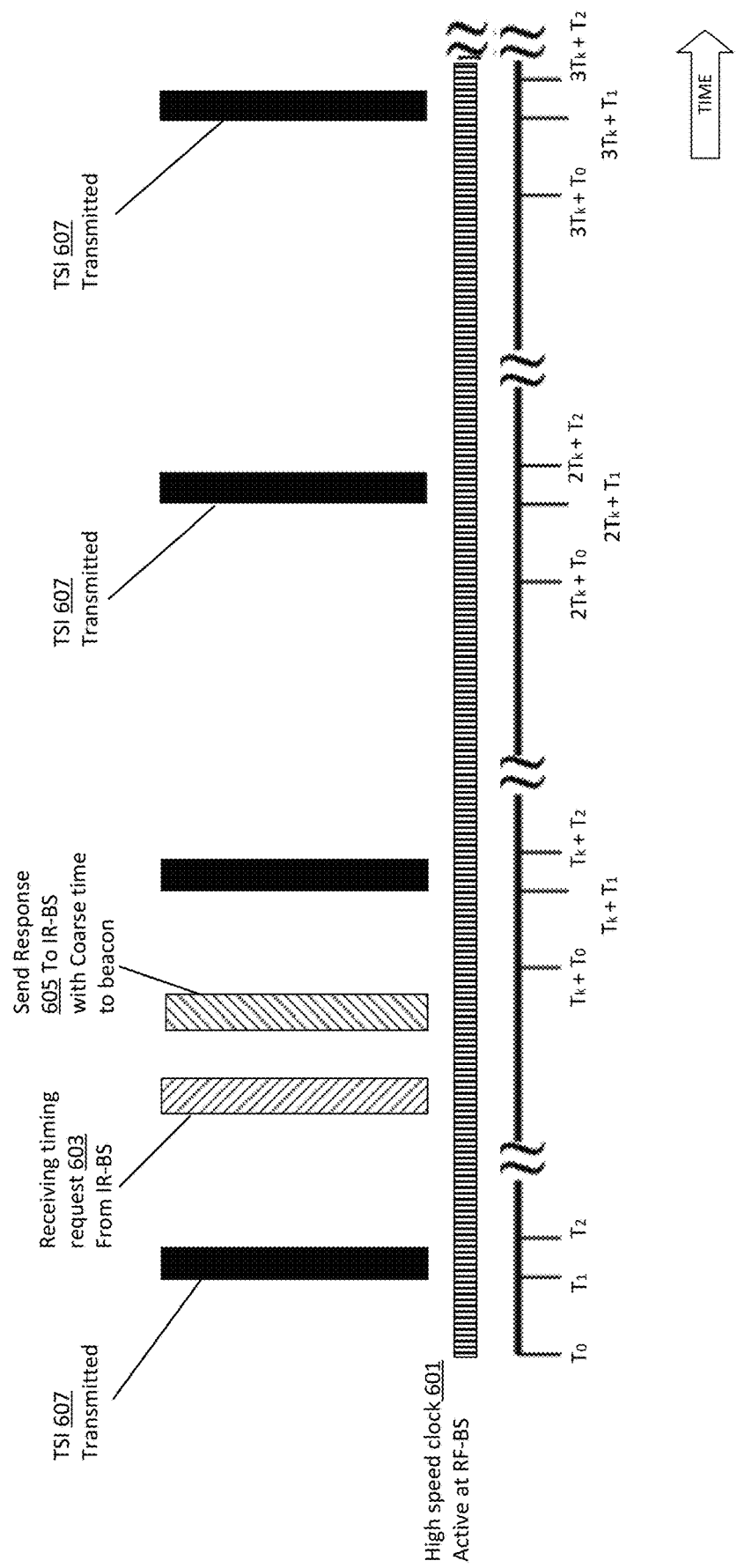
FIG. 6 depicts an example of timing of TSI from an RF base station, in accordance with another embodiment of the present disclosure.
Figure 7:
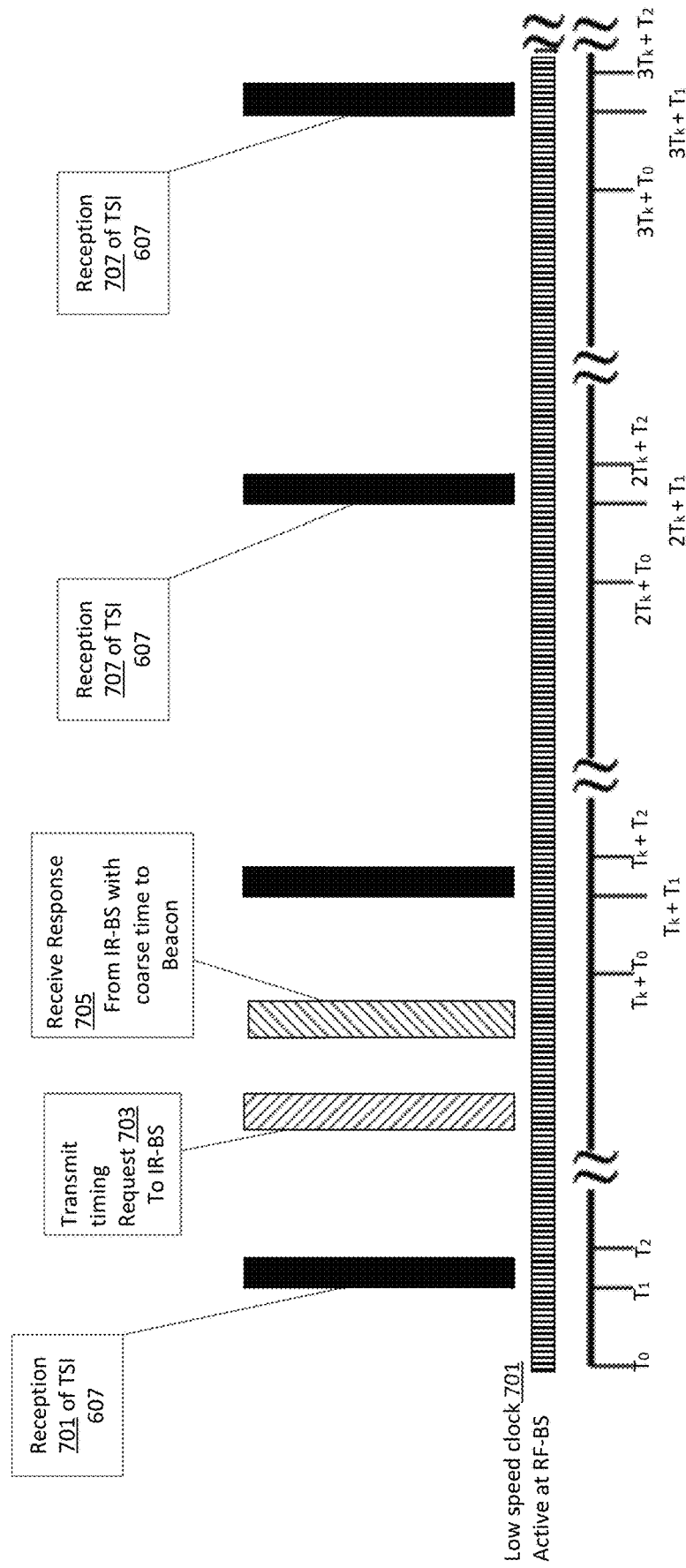
FIG. 7 depicts an example of timing of operations at an IR base station, in accordance with another embodiment of the present disclosure.

FIGS. 6-7 illustrate another embodiment of a method to provide accurate timing information, in which an IR base station 106 requests timing updates from RF base station 110. FIG. 6 depicts an example of timing of the periodic transmission of a timing synchronization information (TSI) signal 607 from RF base station 110, in accordance with one embodiment of the present disclosure. RF base station 110 transmits TSI 607 having a period of TK seconds, and sent at times $T_1$, $TK+T_1$, $2TK+T_1$, ..., $nTK+T_1$. Typically, the period TK is in the range of $1<=TK<=60$ seconds. RF base station 110 may operate substantially continuously a high-speed clock 601.

At some times, which may be unplanned or unpredictable by RF base station 110, RF base station 110 may receive from IR-BS 106 a timing request 603 for timing information. The timing request 603 may be a request for a value of a time delay to a next beacon transmission time or the next IR transmission time. RF base station 110 may respond by transmitting a response 605 that provides coarse timing to the next transmission of TSI 607. This is mainly needed in case the IR base station 106 loses its coarse timing synchronization (e.g., by drifting too far, etc.) and does not accurately know when to initiate the high speed clock. This eliminates excessive power consumption especially in periods where the IR base station 106 is not operational and there are no beacons and the IR base-station 106 needs to search for them.

FIG. 7 depicts an example of timing of operations at an IR base station 106, in accordance with one embodiment of the present disclosure. As shown in the figure, operation of IR base station 106 is periodic with a period of TK, which is the same period TK in the example of FIG. 6 for RF-BS 110. In particular, FIG. 7 depicts periodic reception 707 of TSI 607.

At some predetermined times, IR base station 106 transmits a timing request 703 to RF base station 110. Reception of, and response to timing request 703 by RF base station 110 is depicted in FIG. 6. FIG. 7 depicts reception 705 of the response from RF base station 110 with the coarse timing to the next reception 707 of TSI 607. IR base station 106 may use the timing information within TSI 607 to adjust the coarse clock 701 within IR base station 106.

In some embodiments, rough timing for the time location of the start of the high speed clock 501 is based on a second beacon which is transmitted less often and drives low speed clock 502 until the start time of high-accuracy clock 501.

In some embodiments, multiple RF base stations 110 that control a first set of IR base stations 106 may transmit their TSI 403 signals on different frequencies in order to avoid collisions with other RF base stations 110 that control a different set of IR base stations 106.

In yet another embodiment, multiple RF base stations 110 may transmit their TSI 403 signals in different time slots in order to avoid collisions. IR base stations 106 are able to accommodate the different time slots, for example by provisioning time slots during setup of IR base station 106, or through appropriate notification in the TSI 403 signals.

Figure 8:
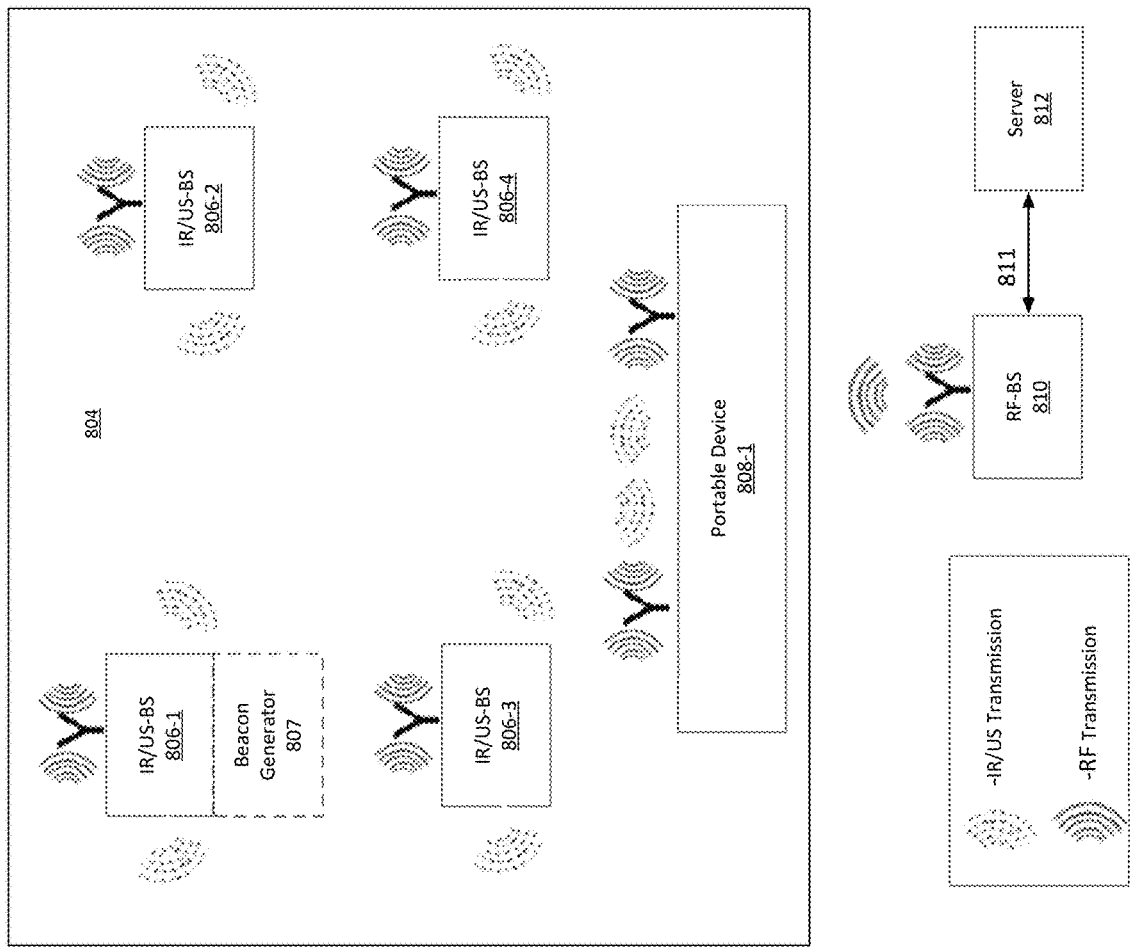
FIG. 8 depicts a block diagram of a system for locating and identifying portable devices in an enclosure, in accordance with one embodiment of the present disclosure.

FIG. 8 depicts another embodiment 800 in accordance with the present disclosure. As shown in FIG. 8, this embodiment comprises four secondary technology base stations 806-1, 806-2, 806-3, 806-4 in zone 804. A secondary technology in the context of this application is a non-Wi-Fi communication technology such as infrared and/or ultrasound (IR/US). An individual but unspecified base station may be referred to as base station 806-n or base station 806. All base stations collectively may be referred to as base stations 806. Each of base stations 806-n may employ a non-Wi-Fi secondary technology such as an infrared communication medium, or ultrasound communication medium, or ZigBee (IEEE standard 802.15.4), or 900 MHz, or any combination, in order to communicate with one or more portable devices 808-1. Embodiment 800 further includes an RF base station 810 that is coupled to a time server 812 by link 811. Link 811 may be either a wired or wireless interface.

RF base station 810 acts as a Wi-Fi access point (A/P). Base stations 806 receive coarse timing information from RF base station 810. In general, although Wi-Fi APs such as RF base station 810 can broadcast, they do not inherently have an ability to send their transmissions at highly-accurate predefined times. This lack of ability arises from inherent limitations of the Wi-Fi protocol. Wi-Fi is fundamentally asynchronous in nature because it requires a transmitting device to listen before it talks, in order to help avoid collisions with other transmitting devices.

In some embodiments, portable devices 808-1 may receive two types of timing signals. A first, coarse timing signal (e.g., from a primary network, etc.) provides coarse timing information. A second, relatively finer timing signal (e.g., from a different primary network or a subnetwork, etc.) provides fine timing information that is more accurate than the coarse timing information. The network of the second timing signal may be coupled to the network of the first timing source in order for the network of the second timing signal to provide corrections to the network of the first timing source.

Each RF base station 810 may provide the first timing signal for coarse timing by use of Wi-Fi signals, and base stations 806 may provide the second timing signal by use of secondary technology signals (e.g., IR/US). For example, the coarse timing information can originate from a Wi-Fi network that cannot guarantee a sufficiently accurate estimate of the time of arrival due to inherent protocol limitations. The fine timing information may be provided from a second source or network that can provide local timing signals (for example, from a dedicated source such as a 900 MHz RF transmitter, a Zigbee transmitter, one or more local transmitters, and so forth).

In some embodiments, one of base stations 806-n may be designated as a "master" base station that includes a beacon generator 807 (e.g., base station 806-1 as depicted in FIG. 8, etc.). Beacon generator 807 of the master base station is capable of providing synchronization signaling that is independent of the timing synchronization of RF base station 810 (i.e., independent of the Wi-Fi network). Beacon generator 807 of the master base station provides synchronization signaling by use of highly accurate transmitted beacons. In this embodiment, base stations 806 will acquire the coarse timing information (e.g., for rough synchronization purposes) directly from the network of RF base station(s) 810, and then listen in expected time slots for the highly accurate transmitted beacons from beacon generator 807 of the master base station. We refer to the base stations 806 receiving the beacon as "slaves." In some embodiments, beacon generator 807 may be part of the master base station 806 itself, while in some other embodiments beacon generator 807 may be a separate entity.

In many cases, coarse synchronization is sufficient, thus allowing both the master and slave base stations to be designed and built as battery-based devices. It should be noted that the fine synchronization requirements are not relative to a clock in the primary network (i.e., the network of RF base station(s) 810), but instead are relative to the secondary clock (i.e., the clock of base stations 806). The primary goal of the fine synchronization is to allow all the base stations 806 to have a common timing information relative to each other. The coarse timing information received by the slave base stations 806 avoids the need for an open receiver to receive the beacons from the master base station. The coarse synchronization limits the time that the slave base stations 806 need to open their receiver until they lock to the master base station.

Embodiments in accordance with the present disclosure may provide an RTLS system that includes a plurality of groups, each group including a battery-operated master base station 806 to transmit timing beacons, wherein the timing beacon generator 807 of master base station 806 obtains its timing synchronization for the timing beacons wirelessly from a timing server 812; and one or more battery-operated secondary technology base stations 806 (i.e., slave base stations) to receive the timing beacons, and to transmit respective secondary technology transmissions based on the received timing beacons; and a portable tag 808-1 to be located, the portable tag 808-1 configured to receive timing beacons and secondary technology transmissions from at least one group.

In some embodiments, timing accuracy of the timing beacon generator 807 relative to timing server 812 is coarser than timing accuracy between the group members.

In some embodiments, the battery-operated slave base stations 806 may receive coarse timing synchronization wirelessly from the timing server 812, and receive fine group timing from the timing beacon generator 807.

In some embodiments, timing of the timing server 812 is derived from an atomic clock, e.g., a standard atomic clock radio providing timing signals via a wireless interface.

In some embodiments, the timing beacon generator 807 obtains its timing synchronization from a WiFi network, and the portable tag 808-1 transmits its location information to a server coupled to the same WiFi network.

In some embodiments, timing beacon generator 807 transmits timing beacons by use of a radio frequency (RF) technology selected from a group consisting of Zigbee, a non-Wi-Fi technology at 900 MHz, a non-Wi-Fi technology at 2.4 GHz and a non-Wi-Fi technology at 5 GHz.

In some embodiments, portable tag 808-1 is configured to synchronize itself to the secondary technology transmissions by obtaining timing from the timing server 812.

It should be noted that in some embodiments, the timing information provided by the time server 812 to each timing beacon generator 807 in the real-time location system may be substantially the same, while in some other embodiments, the timing information provided to each timing beacon generator 807 may not be substantially the same.

In some embodiments, at least some of the timing beacon generators 807 transmit timing beacons at a different frequency in order to avoid collisions with other timing beacons. In some embodiments, at least some of the timing beacon generator 807 transmit timing beacons at a different time in order to avoid collisions with other timing beacons.

In some embodiments, the portable tag 808-1 is configured to synchronize itself to the secondary technology transmissions by locking the timing of the portable tag 808-1 to the timing of the secondary technology transmissions.

In the master/slave embodiments disclosed above, all of the slave base stations are within RF communication range of the master base station. We refer to the master and slaves as a "group", and we refer to the spatial area defined by the RF coverage of the master base station as a "cell."

In the remainder of this disclosure we disclose master/slave embodiments that are capable of synchronizing base stations across a plurality of cells. In other words, for the case of two cells, there is a first master/slave group of base stations within a first cell and a second master/slave group of base stations within a second cell, such that: (1) every slave base station in the first group is within RF communication range of the master base station in this first group; (2) every slave base station in the second group is within RF communication range of the master base station in this second group; (3) there is at least one slave in the first group that is out of RF communication range of the master in the second group; and (4) there is at least one slave in the second group that is out of RF communication range of the master in the first group.

Conditions (3) and (4) above necessitate having a plurality of masters. Otherwise, there could be a single master within RF communication range of all of the base stations in both groups—in which case a single master could synchronize all of the base stations in both groups. In such cases there would effectively be a single group of base stations, rendering separation into two groups unnecessary. In addition, the two cells could be combined into a single cell if desired.

It should be noted that cells may correspond to zones 104 of FIG. 8 in any fashion. In other words, each cell might correspond to a respective zone, or there might be a plurality of cells in a given zone. Therefore, when the number of cells is C, where C is a positive integer, the number of zones in which the cells reside can be any integer between 1 and C inclusive.

We now disclose methods for synchronizing masters across base station groups (i.e., synchronizing (i) the master of a first group of base stations in a first cell and (ii) the master of a second group of base stations in a second cell), thereby achieving synchronization of all of the base stations in both groups. In other words, the master of the first group, the slaves of the first group, the master of the second group, and the slaves of the second group are all synchronized as a result of these methods. It should be noted that multiple base station groups are necessary when the maximum coverage range of a master base station is insufficient to encompass all of the slave base stations. As described in detail below, for the case of multiple groups, each group has its own master, and the masters are synchronized. Given that each master synchronizes its slaves (i.e., the slaves in the master's group) synchronization across the groups is achieved.

Figure 9:
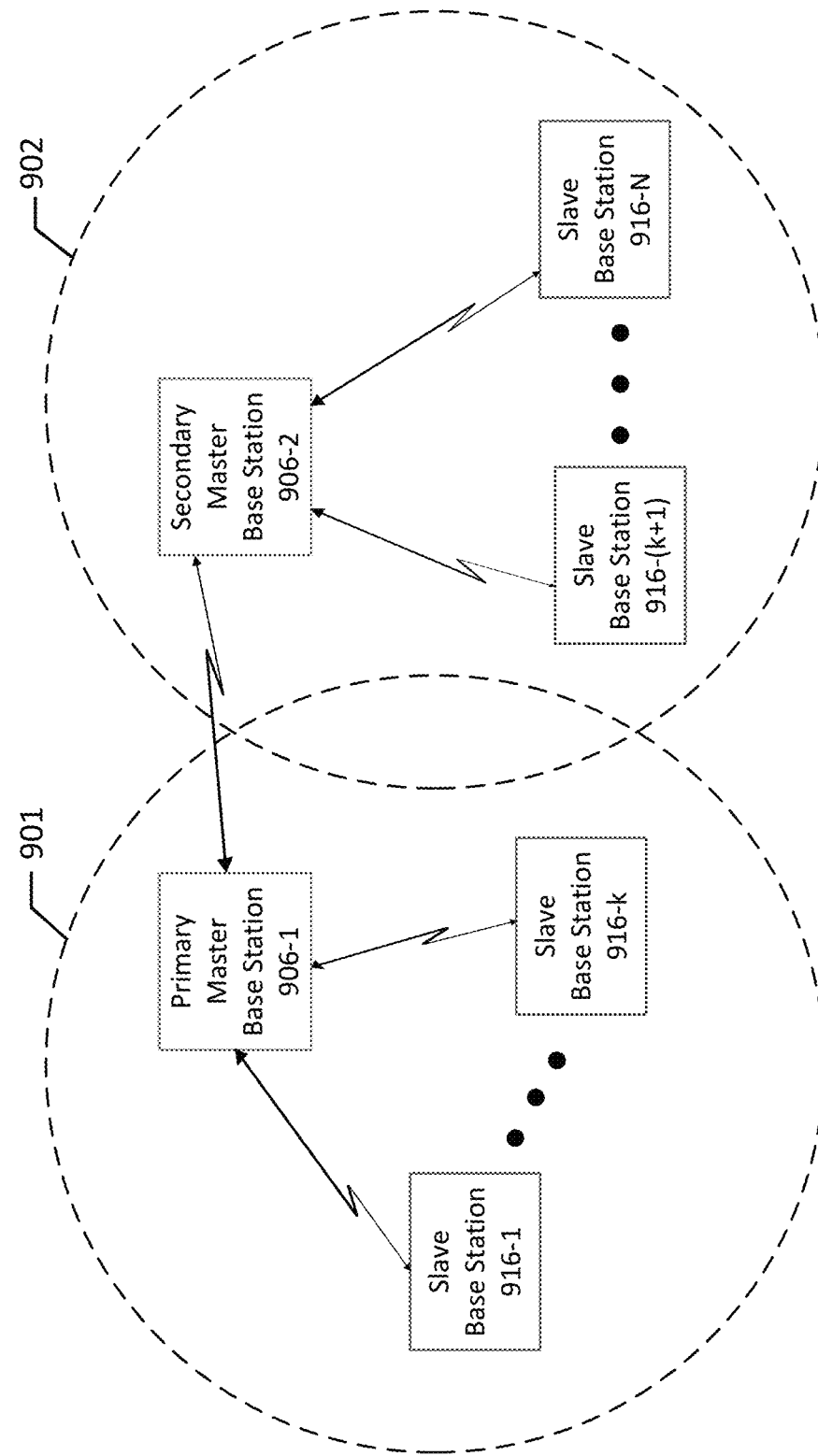
FIG. 9 depicts an example of a two-cell system for locating and identifying portable devices in an enclosure, in accordance with one embodiment of the present disclosure.

FIG. 9 depicts a multi-cell system 900 for locating and identifying portable devices in an enclosure, in accordance with one embodiment. It should be noted that, for illustrative purposes, system 900 has two cells. However, as will be appreciated by those skilled in the art, some other multi-cell systems may have three or more cells, and it will be clear to those skilled in the art, after reading this disclosure, how to employ the methods disclosed below in such systems.

As shown in FIG. 9, system 900 comprises cells 901 and 902. Cell 901 contains a primary master base station 906-1 and a set of one or more slave base stations 916-1 through 916-K, where K is an integer greater than or equal to 1. Cell 902 contains a master base station 906-2 and a set of one or more slave base stations 916-(K+1) through 916-N, where N is an integer greater than or equal to (K+1). In one embodiment, system 900 also comprises a time server (not depicted in FIG. 9) (e.g., a time server that is capable of performing the functions of time server 812, etc.). As described below, some embodiments of system 900 may include an RF base station (e.g., an RF base station that is capable of performing the functions of RF base station 810 [not depicted in FIG. 9], etc.), while other embodiments may not include an RF base station. In some embodiments comprising both an RF base station and a separate time server, the RF base station may be coupled to the time server via wired Ethernet, while in some other such embodiments, the coupling may be wireless (e.g., via RF, etc.).

Master base station 906-1 comprises an RF transceiver capable of receiving RF signals (e.g., from another master base station, from an RF base station, from a time server, etc.) and transmitting RF signals (e.g., to another master base station, to slave base stations 916-1 through 916-K, etc.). In some embodiments, the RF signals may be received and transmitted directly, while in some other embodiments the signals may be received via a network (e.g., a Wi-Fi network, etc.). It should be noted that in some embodiments master base station 906-1 may comprise a separate RF transmitter and RF receiver, rather than an integrated transceiver.

Master base station 906-1 further comprises one or both of an IR transmitter and an US transmitter capable of transmitting IR/US signals to a portable tag or some other device. In some embodiments, master base station 906-1 may also comprise one or both of an IR receiver and an US receiver.

Master base station 906-1 is further capable of performing the functions of master base station 806-1 above, and of performing additional functions as described in detail below. In some embodiments, as described below, master base station 906-1 may also be capable of receiving other types of signals, such as Zigbee or Bluetooth.

Slave base stations 916-1 through 916-K each comprise an RF transceiver capable of transmitting and receiving RF signals, and one or both of an IR transmitter and an US transmitter. Slave base stations 916-1 through 916-K are further capable of performing the functions of slave base stations 806 above (e.g., 806-2, 806-3, 806-4 in the example of FIG. 8, etc.), and are further capable of performing additional functions as described in detail below. It should be noted that in some embodiments slave base stations 916-1 through 916-K may comprise a separate RF transmitter and RF receiver, rather than an integrated transceiver.

In one embodiment, master base station 906-1 and slave base stations 916-1 through 916-K acquire coarse (i.e., lower accuracy) timing information (e.g., for rough synchronization purposes, etc.) either from an RF base station, or directly from a time server (i.e., without a RF base station serving as a "go-between" between the time server and the master/slaves) In the latter case (i.e., where the master and slave base stations receive the coarse timing information directly from the time server), RF base stations are not necessary for synchronization, and therefore can be either included in the system or omitted from the system.

In some examples where one or more RF base stations are included in the system, wireless transmissions from the RF base station(s) may be independent of any Wi-Fi network. In systems where RF base stations are omitted, the time server may have a wired connection to master base station 906-1 and possibly to one or more slaves, or may wirelessly transmit signals to the master and slaves. In the latter case (i.e., wireless transmission), the wireless transmission by the time server may be independent of any Wi-Fi network, as in the case of wireless transmission from an RF base station.

In some embodiments, master base station 906-1 comprises an integrated beacon generator that is capable of transmitting RF beacon signals, while in some other embodiments master base station 906-1 is communicably coupled to a separate beacon generator (not depicted in the figure). Master base station 906-1's beacon generator (whether integrated or separate) is capable of providing synchronization signaling that is independent of the timing synchronization of nodes in a coexisting RF-based network (e.g., a Wi-Fi network that cannot guarantee a sufficiently-accurate estimate of the time of arrival due to inherent protocol limitations, etc.). More particularly, master base station 906-1's beacon generator can provide synchronization signaling by use of highly-accurate transmitted beacons. In one embodiment, master base station 906-1 receives fine timing information (i.e., higher-accuracy timing) from a second source or network that can provide local timing signals (for example, from a dedicated source such as a 900 MHz RF transmitter, a Zigbee transmitter, one or more local transmitters, and so forth), synchronizes its clock using the fine timing information, and transmits the fine timing information to slave base stations 916-1 through 916-K. More particularly, slave base stations 916-1 through 916-K use the coarse timing to know when to turn on their high-speed clocks to listen for finely-timed beacons transmitted by master base station 906-1, as in the master/slave system of FIG. 8 above. We subsequently referred to these finely-timed beacons, which are transmitted from the master to the slaves within its cell and correspond to the RF beacons disclosed in the examples of FIGS. 1 through 8 above, as "Super Sync RF beacons". In one example, there is a six microsecond delay between the master base station 906-1 synchronizing its clock and subsequently transmitting the fine timing information to its slave base stations 916-1 through 916-K.

Master base station 906-2 comprises hardware and software similar to master base station 906-1 and operates with respect to slave base stations 916-(K+1) through 916-N (e.g., transmitting Super Sync RF beacons, etc.), rather than with respect to slave base stations 916-1 through 916-K. Similarly, slave base stations 916-(K+1) through 916-N comprise hardware and software similar to slave base stations 916-1 through 916-K and are capable of performing the same functions as slave base stations 916-1 through 916-K; however slave base stations 916-(K+1) through 916-N operate with respect to master base station 906-2 rather than with respect to master base station 906-1. In one example, master base station 906-1 is a primary master base station, as described in detail below, and master base station 906-2 is a secondary master base station, also described in detail below.

As described in detail below, the RF Super Sync Beacon is used to synchronize IR/US base stations within a cell, where, as was defined above, a cell is the spatial area of IR/US signal coverage of a group of IR/US base stations (e.g., the group in cell 901 comprising master base station 906-1 and slave base stations 916-1 through 916-K, etc.). In accordance with one embodiment, the RF Super Sync Beacons function in a manner similar to the beacon signals generated by beacon generator 807 (e.g., providing fine timing information to the slave IR/US base stations in the cell, etc.). The RF Super Sync Beacon on its own, however, does not solve the problem of synchronizing IR-BSs that belong to different cells. In order to overcome this problem and achieve synchronization among multiple cells, the aforementioned RF Cell Beacon is used to synchronize masters, and the RF Super Sync Beacon is used synchronize IR/US base stations (both the master and slaves) within the call, as described in detail below.

In one embodiment, an IR Change within an IR/US base station group (i.e., a tag moves such that it becomes closest to a different IR/US base station) is immediate as the devices belonging to the group are synchronized. However, an IR Change to a new cell requires time to search and lock on to the IR/US base stations in the new cell. Consequently, synchronization of IR/US base stations in the new cell via the RF Cell beacon enables detection of a tag zone change event (i.e., a portable tag moving from one zone to another) without any delay.

In one embodiment, two different types of master IR/US base stations are employed: a primary master IR/US base station, which runs in accordance with its own clock, and a secondary master IR/US base station that: (i) receives one or more RF Cell beacons from another master IR/US base station (e.g., a primary master IR/US base station, a different secondary master IR/US base station, etc.); (ii) synchronizes to these one or more RF Cell beacons; and (iii) sends one or more RF Cell beacons to other secondary master IR/US base stations for synchronization. In one implementation, each master IR/US base station has a unique integer ID, with the primary master having an ID equal to 1, and secondary masters can transmit to other secondary masters having a higher ID value, but not a lower ID value (for example, a secondary master whose ID equals 5 can transmit RF Cell beacons to the secondary master whose ID equals 6, the secondary master whose ID equals 7, etc.). It should be noted that in accordance with one embodiment, any particular master 906 (e.g., master 906-1, master 906-2, etc.) can be programmed to function as either a primary or secondary master, and is therefore capable of performing functions of a primary master and functions of a secondary master, which are described in detail below.

During an initial synchronization process the secondary master performs long RF Opens; receives one or more RF Cell beacons, selects the strongest RF Cell beacon (i.e., the RF Cell beacon having the largest received signal strength indication [RSSI]); designates the master base station that transmitted this beacon (which might be a primary master or another secondary master) as its parent; synchronizes its clock based on this beacon (i.e., it "locks" with the parent, and becomes the parent's "child"); and transmits RF Cell beacons to its own child secondary master if it has a child. If a parent stops transmitting its RF Cell beacon (e.g., due to a hardware failure, a dead battery, etc.), the child becomes unlocked from the parent, and in response the child once again performs the initialization process (i.e., searches for RF Cell beacons, selects the strongest RF Cell beacon, etc.).

In accordance with one embodiment, the primary master runs with its own clock, sends RF Cell beacons in accordance with a period (e.g., every 12 seconds, etc.), and sends RF Super Sync beacons based on a profile by which the master IR-BS can be configured. In one implementation, the "child" secondary master may run as per the configured locked parent master. In one example, a master's ID (whether a primary, secondary, parent or child) may be configured based on its RF coverage [Not sure what this means—example?].

In one embodiment, RF Cell Beacon Slot IDs are also configurable in an IR-BS profile. Based on the RF Cell Beacon Slot ID, RF Cell beacon slots are calculated in primary/secondary IR-BSs to transmit RF Cell beacons. In one implementation, a Transmit beacon slot value (i.e., the time/offset at which the RF Cell beacon is transmitted) for the parent master may be calculated based on its configured ID, and a Receive beacon slot value for the child secondary master may be obtained from the parent. Thus, each master IR/US base station can sync with other master IR/US base stations, and this can be used to sync all of the IR/US base stations. In accordance with one embodiment, a master IR-BS may transmit RF Cell beacons in any time slot except RF Super Sync time slots and IR time slots (i.e., time slots during which IR/US base stations [both master and slaves] transmit IR beacons). In one example, an IR Profile is set to 1.5 seconds, and RF Cell beacons can be transmitted in 24 out of 48 time slots. Accordingly, approximately 240 unique master IR-BS can operate in a given area without collision. RF Super Sync beacons are transmitted in 9 different time slots and at 12 different frequencies in one example, thereby enabling operation of 108 IR-BSs in a given area without collisions.

In accordance with one embodiment, the primary master transmits RF Cell beacons in accordance with the selected period, and the secondary master receives the RF Cell beacons from its configured locked master (which as noted above, might be either a primary master or a secondary master). The secondary master IR/US base stations synchronize with the RF Cell beacon, and slave IR/US base stations synchronize based on the RF Super Sync beacon. Therefore all of the IR/US base stations within a cell are synchronized using RF Super Sync beacons, and all master IR/US base stations are synchronized across two or more cells using RF Cell beacons. As a result, all of the IR/US base stations synchronize with the primary master.

In accordance with one embodiment, if a child secondary master does not lock with a parent, the child does not receive RF Cell beacons from the parent, and the child does not transmit any RF Cell beacons to any other masters (e.g., a child of the child), thus breaking the "chain" of RF Cell beacons. The child secondary master, however, can still send RF Super Sync beacons to its slaves to maintain synchronization within the cell.

Figure 10:
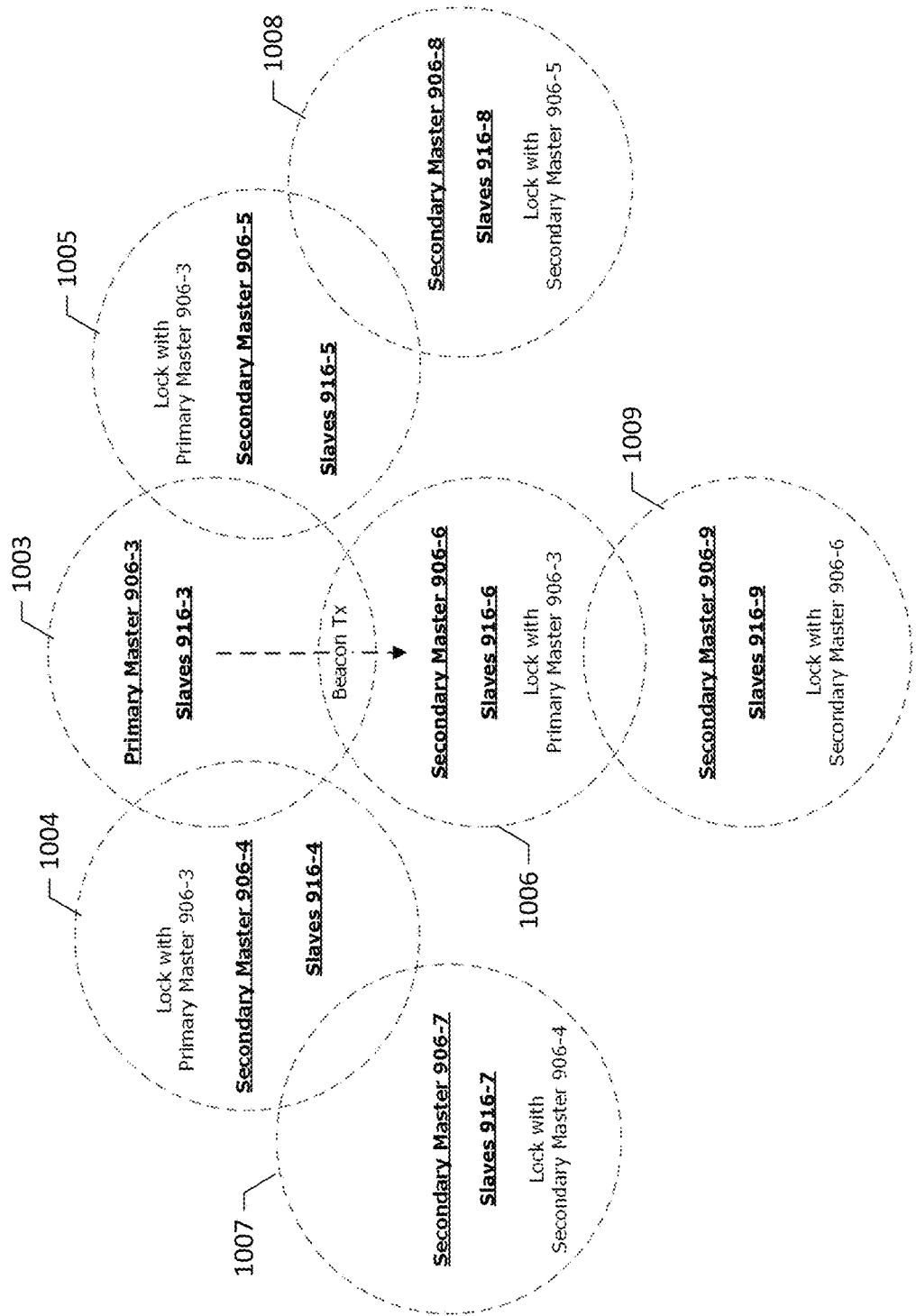
FIG. 10 depicts an example of a seven-cell system for locating and identifying portable devices in an enclosure, in accordance with one embodiment of the present disclosure.
Figure 11:
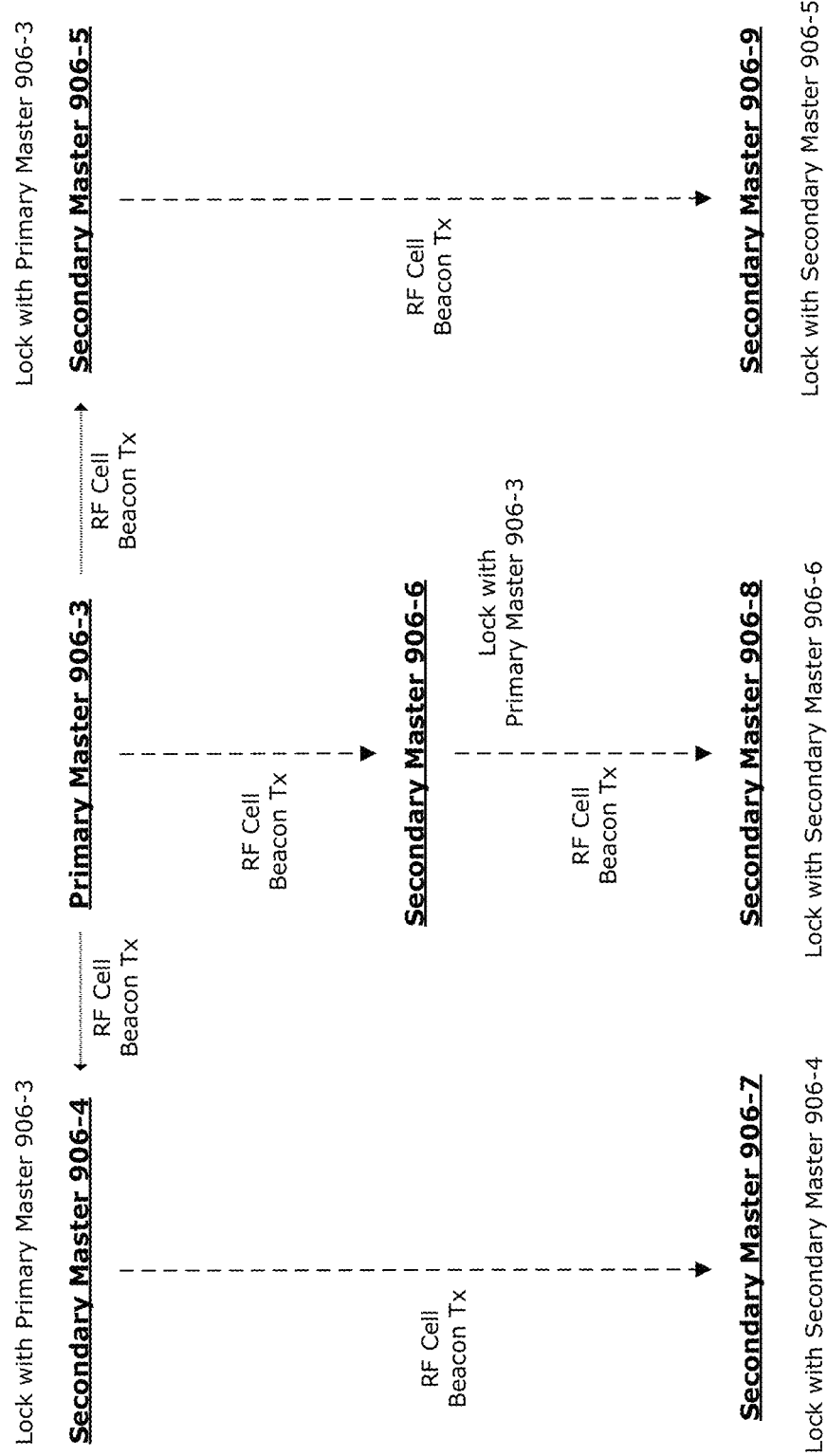
FIG. 11 depicts an example illustrating the transmission of RF Cell beacons among master base stations.
Figure 12:
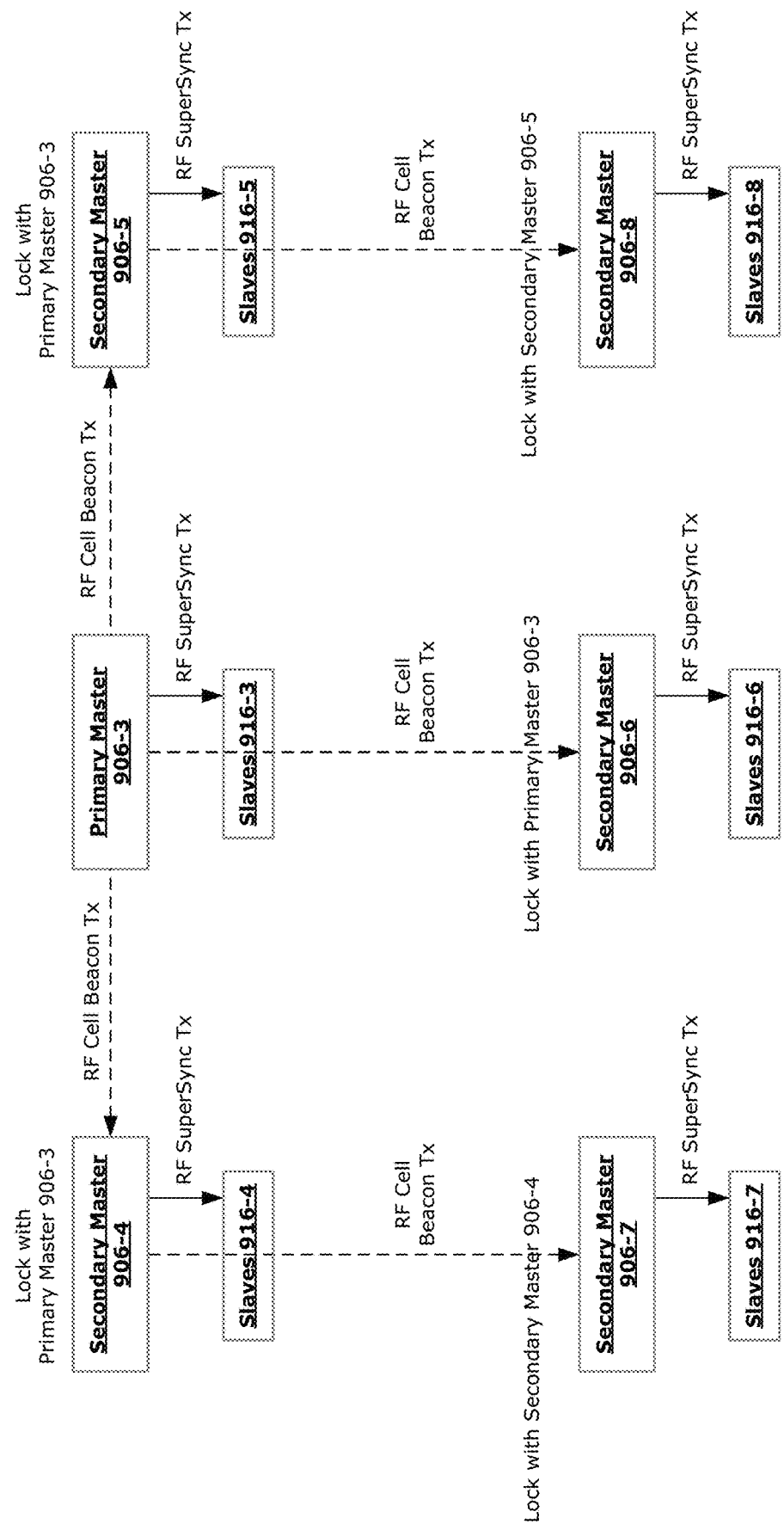
FIG. 12 depicts an example illustrating the transmission of both RF Cell beacons and RF Super Sync beacons to achieve synchronization among masters and slaves.

An example of the above process is illustrated in FIGS. 10 through 12. FIG. 10 depicts an example of a system comprising seven cells 1003 through 1009, in accordance with one embodiment of the present disclosure. As shown in FIG. 10, cell 1003 contains a primary master 906-3 and a set of one or more slaves 916-3. Cells 1004 through 1009 contain, respectively, secondary masters 906-4 through 906-9, and each of these cells contains a respective set of slaves 916-4 through 916-9. FIG. 11 depicts an example illustrating the transmission of RF Cell beacons to achieve synchronization among the masters 906-3 through 906-9, and FIG. 12 illustrates the transmission of both RF Cell beacons and RF Super Sync beacons to achieve synchronization among all of the masters 906-3 through 906-9 and all of the slaves in 916-4 through 916-9.

In accordance with one embodiment, when the primary master is powered on it sends a Profile request (e.g., via UDP, via some other protocol or method, etc.). If the primary master receives a configured profile in response to the request, it operates in accordance with the configured profile. If the primary master does not receive a configured profile in response to the request, it operates in accordance with a preconfigured profile. In one embodiment, the primary master runs as per its own clock.

The primary master begins sending RF Cell Beacons in accordance with a particular period; initiates transmission of RF Super Sync Beacons in accordance with a particular period; and initiates transmission of IR Beacons in accordance with a particular period. As described above, the IR Beacon may be used to potentially locate a tag in its vicinity. In some implementations, the primary master may also send a profile request in accordance with a particular period, after which the profile is updated based on the response, if any is received. In some examples all of the periods may be the same, while in some other examples one or more of the periods may be different. In one implementation, one or more of the periods may be based on the primary master's profile.

In accordance with one embodiment, a secondary master operates as follows:

SM1: When the secondary master is powered on it sends a Profile request (e.g., via UDP, via some other protocol or method, etc.). If the secondary master receives a configured profile in response to the request, then the secondary master operates in accordance with the configured profile.

SM2: If the secondary master does not receive a configured profile in response to the request, then the secondary master operates in accordance with a preconfigured profile.

SM3: The secondary master will search for an RF Cell beacon from its configured master, which will then be used to synchronize with its master, which in turn results in a locked parent-child relationship. In one implementation, the RF Cell beacon specifies a Receive beacon slot value.

SM4: If the secondary master receives the RF Cell beacon from its parent master, then the secondary master synchronizes its clock, initiates transmission of RF Super Sync beacons to slaves and initiates transmission of IR beacons, as per its IR profile, for potential receipt by one or more portable tags.

SM5: If the secondary master does not receive a RF Cell beacon, then the secondary master goes back to SM3; otherwise execution proceeds to SM6 below. In one implementation, the secondary master does not transmit RF Super sync beacons or IR beacons until it receives a response from another master (which may become a locked parent master). In one example, this will occur until a search is successful, up to a maximum of three times, and will be repeated in accordance with a particular period (e.g., every 20 minutes, etc.).

SM6: After synchronization with the parent master, thereby establishing a locked parent-child relationship, the secondary master initiates transmission of RF Super sync beacons to slaves, and initiates transmission of IR beacons, as per its IR profile, for potential receipt by one or more portable tags.

SM7: After the initial Synchronization the secondary master knows its beacon slot and will receive RF Super Sync beacons from its parent master in accordance with the established period, which are used by the secondary master to synchronize its clock.

SM8: The secondary master listens for RF Super Sync beacons from the parent master and synchronizes its clock accordingly. If two consecutive RF Super Sync beacons are missed then the secondary master goes back to SM3.

In accordance with one embodiment, a slave IR-BS operates as follows:

S1: When the slave IR-BS is powered on it sends a Profile request (e.g., via UDP, via some other protocol or method, etc.). If the slave IR-BS receives a configured profile in response to the request, it operates in accordance with the configured profile.

S2: If the slave IR-BS does not receive a configured profile in response to the request, it operates in accordance with a preconfigured profile.

S3: The slave IR-BS listens for an initial RF Super Sync Beacon from its configured master.

S4: If the slave IR-BS receives an RF Super sync beacon, then the slave IR-BS synchronizes its clock and transmits IR beacons as per its IR Profile.

S5: If the slave IR-BS does not receive the initial RF Super Sync Beacon, then the slave IR-BS will go back to S3. In one embodiment, this will occur until a search is successful, up to a maximum of T times, where T is a positive integer. In one implementation the slave IR-BS does not transmit any IR beacons until it receives an RF Super Sync Beacon.

S6: After synchronization the slave IR-BS receives RF Super sync beacons and transmits IR beacons as per the IR Profile.

S7: If the slave IR-BS fails to receive a RF Super Sync beacon then it will transmit noise instead of an IR beacon.

S8: If the slave IR-BS fails to receive an RF Super sync beacon Q consecutive times, where Q is a positive integer, then execution goes back to S3.

In one implementation the slave IR-BS sends a profile request in accordance with a particular period (e.g., one hour, etc.), and the profile is updated based on the response, if any is received.

It should be noted that the embodiments disclosed above represent just one example of achieving synchronization across cells (i.e., synchronizing base stations that are in two or more different cells). Some other embodiments of the present disclosure may employ variations of this implementation, or may employ one or more altogether-different implementations or techniques in order to achieve synchronization across cells. Further, some other embodiments of the present disclosure may employ other types of non-RF technologies in lieu of IR or US (e.g., electromagnetic signals outside the RF and IR ranges, etc.).

It is understood that reference throughout the specification to "one embodiment" or "an embodiment" or "some embodiments" means that a particular feature, structure, material, or characteristic described in connection with the embodiment(s) is included in at least one embodiment of the present disclosure, but not necessarily all embodiments. Consequently, the appearances of the phrase "in one embodiment," "in an embodiment," or "in some embodiments" in various places throughout the Specification are not necessarily all referring to the same embodiment. Similarly, the appearances of the phrase "in one implementation," "in an implementation," or "in some implementations" in various places throughout the Specification are not necessarily all referring to the same implementation. Similarly, the appearances of the phrase "in one example," "in an example," or "in some examples" in various places throughout the Specification are not necessarily all referring to the same example. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:
a first group of wireless base stations comprising a first wireless base station and a second wireless base station that is within RF communication range of the first wireless base station,
the first wireless base station comprising a first RF transmitter to transmit a first RF beacon and a second RF beacon, and a first non-RF transmitter to transmit a first non-RF beacon that, when received by a portable tag, identifies a first location of the portable tag, and
the second wireless base station comprising a first RF receiver to receive the first RF beacon, a first clock to synchronize using the first RF beacon, and a second non-RF transmitter to transmit a second non-RF beacon that, when received by the portable tag, identifies a second location of the portable tag; and
a second group of wireless base stations comprising a third wireless base station that is within RF communication range of the first wireless base station and is out of RF communication range of the second wireless base station, and a fourth wireless base station that is within RF communication range of the third wireless base station and is out of RF communication range of the first wireless base station,
the third wireless base station comprising an RF transceiver to receive the second RF beacon and transmit a third RF beacon, a second clock to synchronize using the second RF beacon, and a third non-RF transmitter to transmit a third non-RF beacon that, when received by the portable tag, identifies a third location of the portable tag, and
the fourth wireless base station comprising a second RF receiver to receive the third RF beacon transmitted by the third wireless base station, a third clock to synchronize using the third RF beacon transmitted by the third wireless base station, and a fourth non-RF transmitter to transmit a fourth non-RF beacon that, when received by the portable tag, identifies a fourth location of the portable tag.

2. The apparatus of claim 1, further comprising the portable tag.

3. The apparatus of claim 1 wherein the portable tag transmits to a server an identifier of the portable tag and an identifier encoded in a non-RF beacon received by the portable tag.

4. The apparatus of claim 1 wherein the second wireless base station is further to receive timing information transmitted over a wireless network, and wherein the timing information has lower accuracy than the first RF beacon.

5. The apparatus of claim 1 wherein the third wireless base station is further to:
receive a fourth RF beacon transmitted by a fifth wireless base station belonging to a third group of wireless base stations, and
select the first wireless base station to associate with based on a received signal strength indication (RSSI) of the fourth RF beacon and an RSSI of the first RF beacon.

6. The apparatus of claim 1 wherein the third wireless base station listens for the first RF beacon during a time slot that is established by the first wireless base station and provided to the third wireless base station.

7. The apparatus of claim 1 further comprising a fifth wireless base station belonging to a third group of wireless base stations, the fifth wireless base station to receive a fourth RF beacon transmitted by the third wireless base station.

8. The apparatus of claim 7 wherein the third wireless base station stops transmitting the fourth RF beacon in response to the first wireless base station stopping transmission of the first RF beacon.

9. The apparatus of claim 1 wherein the first non-RF beacon is an infrared beacon.

10. The apparatus of claim 1 wherein the first non-RF beacon is an ultrasound beacon.

11. A method comprising:
transmitting, by a first wireless base station belonging to a first group of wireless base stations: a first RF beacon to a second wireless base station belonging to the first group of wireless base stations, a second RF beacon to a third wireless base station belonging to a second group of wireless base stations, and a first non-RF beacon that, when received by the portable tag, identifies a first location of the portable tag, wherein the third wireless base station is out of RF communication range of the second wireless base station;
synchronizing, by the second wireless base station, a clock of the second wireless base station using the first RF beacon;
transmitting, by the second wireless base station, a second non-RF beacon that, when received by the portable tag, identifies a second location of the portable tag;
receiving, by the third wireless base station, the second RF beacon;
synchronizing, by the third wireless base station, a clock of the third wireless base station using the second RF beacon;
transmitting, by the third wireless base station, a third non-RF beacon that, when received by the portable tag, identifies a third location of the portable tag;
transmitting to a server, by the portable tag, an identifier of the portable tag and an identifier encoded in a non-RF beacon B received by the portable tag, wherein the non-RF beacon B is one of the first non-RF beacon, the second non-RF beacon, the third non-RF beacon, or a fourth non-RF beacon received by the portable tag, and where the fourth non-RF beacon received by the portable tag is transmitted by one of the first wireless base station, the second wireless base station, the third wireless base station, or a fourth wireless base station; and
determining, by the server, a location of the portable tag based on the identifier encoded in the non-RF beacon B received by the portable tag.

12. The method of claim 11 further comprising:
receiving, by the third wireless base station, a third RF beacon that is transmitted by a fourth wireless base station belonging to a third group of wireless base stations; and
selecting, by the third wireless base station, the first wireless base station to associate with based on a received signal strength indication (RSSI) of the third RF beacon and an RSSI of the first RF beacon.

13. The method of claim 11 wherein the third wireless base station listens for the first RF beacon during a time slot that is established by the first wireless base station and provided to the third wireless base station.

14. The method of claim 11 further comprising:
transmitting, by the third wireless base station, a third RF beacon; and receiving, by a fourth wireless base station belonging to a third group of wireless base stations, the third RF beacon.

15. The method of claim 11 wherein the first non-RF beacon is an infrared beacon.

16. The method of claim 11 wherein the first non-RF beacon is an ultrasound beacon.

17. The method of claim 11 wherein the portable tag transmits to the server via an RF-based network.

18. The method of claim 11 further comprising:
receiving, by the third wireless base station, timing information that has lower accuracy than the first RF beacon.

19. The method of claim 18 wherein the timing information is transmitted over an RF-based network.

* * * * *